Patented July 27, 1926.

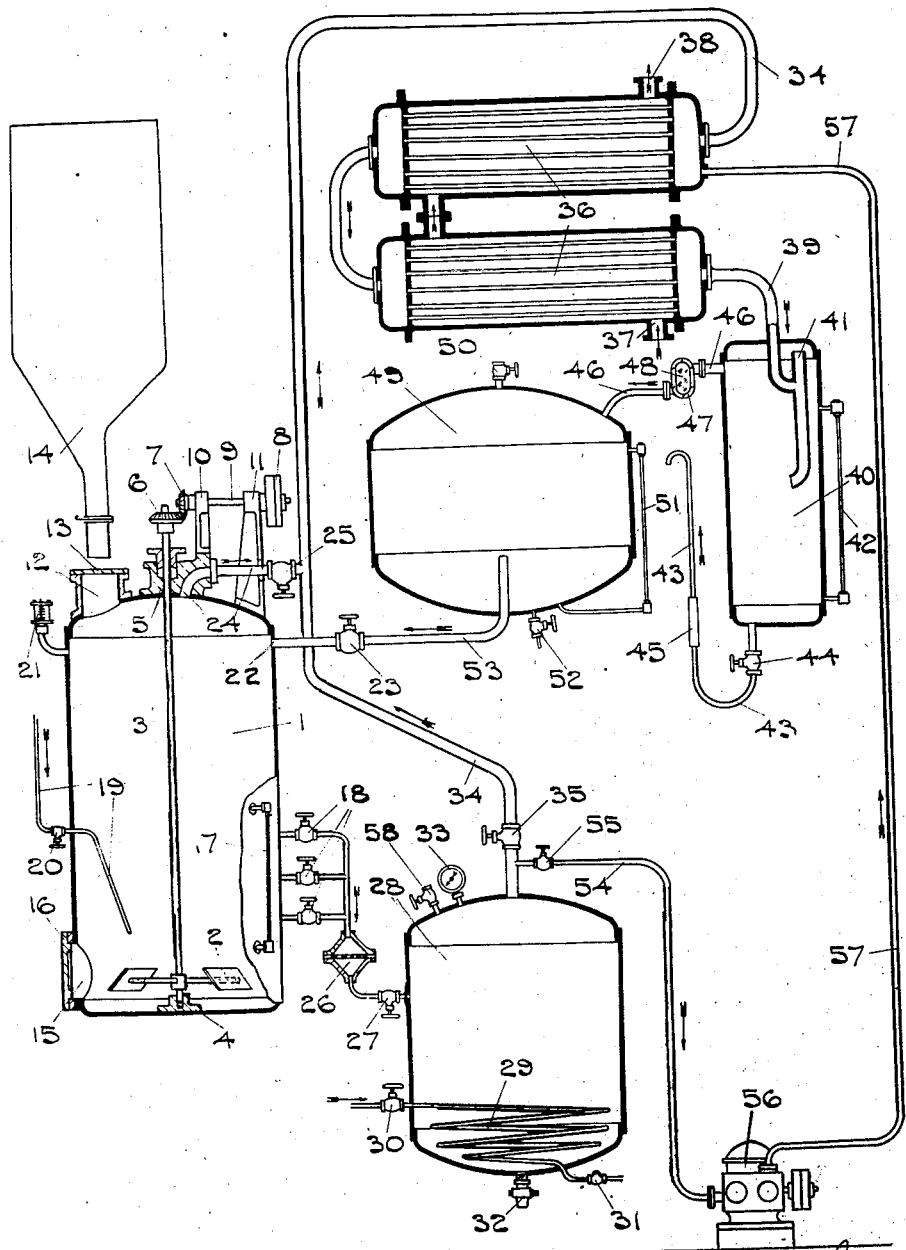

1,593,964

UNITED STATES PATENT OFFICE.

NIVEN BUCHAN, OF AUCKLAND, NEW ZEALAND.

METHOD OF OBTAINING PURE GUM FROM SOME CRUDE GUM MATERIALS AND APPARATUS THEREFOR.

Application filed June 18, 1925, Serial No. 38,093, and in New Zealand July 23, 1924.

This invention concerns kauri-gum and has as its object to provide a method for yielding a purified kauri-gum more suited for its various technical applications such as, for instance, in varnish making, than that usually obtainable.

Kauri-gum is a copal resin found in nature principally in New Zealand and chiefly in the Auckland Province. It is usually associated with many impurities and even after separation of the foreign matters by washing, sieving, flotation and the like the lower grades still contain impurities such as decomposed kauri-gum, wood, charcoal and mineral matter which render the gum of low value.

According to this invention crude kauri-gum is extracted with a solvent consisting of ethyl ether or a mixture of ethyl ether and a volatile hydrocarbon and having the property of dissolving out the pure gum and the essential oils, while leaving the undissolved matters behind, the extract being subjected to volatilization so that the final product is purified kauri-gum containing essential oils in solid form.

The following serves to illustrate how the invention is carried into effect:

The lower grade gum is stirred with a sufficient volume of a mixture of ethyl ether and benzine until the pure gum dissolves. The mixture is then allowed to settle so that the impurities are precipitated. The clean solution is then run into a still and the solvent recovered by distillation, whereupon there remains clean kauri-gum which while hot is sufficiently fluid to be run into open receptacles in which on cooling the solid blocks or lumps are formed and from which they can be removed.

The grade of kauri-gum most suited to my process is that which is low in market value and as high as possible in undecomposed kauri-gum content. It is preferable to have the material in powdered form, say to pass a 10 mesh screen or finer, thus assisting quick solution. The powdered gum should be dried either by thorough sun drying or by artificial means at temperatures below 100° C. Prolonged drying at temperatures over 100° C. causes polymerization of the gum which thus becomes insoluble. The proportions of the solvents, when a mixture of ethyl ether and a hydrocarbon is used, may be varied, but that found most convenient is one volume of ethyl ether to two volumes of benzine. When making up losses of solvent, the initial hydrometer reading of the mixture is maintained by adding ethyl ether to lower and benzine to raise the specific gravity. The volume of the mixture best suited to complete solution and to rapid settling of the impurities is about seven pints to the pound of pure kauri gum to be dissolved. There must always be sufficient ethyl ether present to ensure the complete solution of the gum. Decomposition caused by the combination of bases principally lime and iron with the organic acids of the gum, is accompanied by the liberation of oils. This oil in so far as it remains attached to the material treated is taken up by the solvent and enters into the composition of the finished extracted product. This point is of importance because the essential oil in kauri-gum is what determines its superiority over other copal resins as a flux or medium. The product is also distinguished from the naturally occurring fossil kauri-gum by its freedom from inclusions and encrustations.

A suitable apparatus according to my invention is illustrated in the accompanying drawings showing a sectional elevation thereof.

The extractor 1 is a cylindrical vessel in the inside of which near the bottom is an agitator 2 attached to a shaft 3 mounted in a bearing 4.

The upper end of shaft 3 passes out of extractor 1 through a stuffing box 5 and is rotated by means of bevel wheels 6 and 7, pulleys 8, and shaft 9, mounted in pedestal bearings 10 and 11. To the top of the extractor 1 is fitted a charging hole 12 with door 13 directly above which is placed the supply hopper 14. To the side near the bottom of extractor 1 the discharging hole 15 with door 16 is fitted and also to the side is fitted a liquid gauge 17 and three decanting valves 18 at different levels. To the extractor 1 is also fitted a steam pipe 19 with valve 20; a low pressure safety valve 21; solvent supply pipe 22 with valve 23 and solvent vapour discharge pipe 24 with valve 25. The decanting valves 18 lead to a strainer 26 and from thence through valve 27 to the still 28 which is an airtight cylindrical vessel. Inside and at the bottom of the still 28 there is a steam coil 29, with steam supply valve 30 and steam trap 31 on the outside, a drawing off cock 32 is also fitted to the bottom of still 28. To the top of still 28 is fitted a combined vacuum and pressure gauge 33 the solvent vapour discharge pipe 34 with valve 35 and air admitting valve 58. The solvent vapour pipe 34 passes to a surface condenser 36 cooled by cold water passing into it at pipe 37 and out by pipe 38. A pipe 39 for the condensed vapour passes from the condenser 36 to a water separator 40 which is another cylindrical enclosed vessel the pipe 39 inside water separator 40 having a branch 41 for air releasing.

To the side of the water separator 40 is fitted a liquid gauge 42 and to the bottom a water drain pipe 43 with valve 44 and flexible joint 45 for length extending or reducing. To the side near the top of the water separator 40 is fitted the solvent discharge pipe 46 which passes to a sight gauge 47 with glass inspection cover 48 and from the sight gauge 47 to the solvent storage tank 49 which is a cylindrical air tight vessel. To the top of the storage tank 49 is fitted an air valve 50; to the side a liquid gauge 51; to the bottom a water drain valve 52 also the solvent supply pipe 53 which passes a short distance inside to get above the water. To the solvent vapour pipe 34 just below the valve 35 is connected a vapour suction pipe 54 with valve 55. This pipe 54 leads to a vacuum pump 56 which delivers through delivery pipe 57 to the condenser 36. To operate the apparatus considering all valves and doors closed, the charging door 13 is opened and a charge of dried powdered gum with impurities admitted to the extractor 1 from hopper 14; the door 13 is then again closed. Valves 23 and 25 are opened, allowing the quantity of solvent required (benzine and ethyl ether) to flow through pipes 22 and 53 into the extractor 1, the displaced air passing to the condenser 36 through valve 25 and pipes 24 and 34 the valves 23 and 25 being then again closed. The agitator 2 is set in motion, and the solvent quickly dissolves the gum. The agitator 2 is stopped and the solution allowed to settle, the level of separation between the pure solution and the undesirable foreign matter such as wood, charcoal, gum dirt and mucilage being ascertainable by the liquid gauge 17 the pure solution being uppermost. The decanting valve 18 nearest above the separation level is turned on and with valve 27 also turned on the pure solution flows off through strainer 26 into the still 28, the valves 18 and 27 being then turned off. Valve 35 is then turned on and the circulating water admitted to the surface condenser 36. Valve 30 is turned on admitting steam at 130 lbs. per square inch to the steam coil 29 thus raising the temperature of the solution in the still 28. This heating of the solution causes vapourization of the solvent which passes through valve 35 and pipe 34 to the surface condenser and is there again liquefied.

When the solvent is being removed from the still it is necessary to be able to determine when it is all removed; this is discovered by inspecting the sight gauge 47 the glass cover 48 enabling inspection to see when the flow of solvent ceases, indicating the removal of the solvent from the still.

The valve 35 is then closed and valve 55 opened and vacuum pump 56 set in motion a vacuum being created in the still 28 as indicated by the combined vacuum and pressure gauge 33.

This vacuum removes the last traces of solvent from the still 28 leaving only pure gum kept in liquid state by the heat of the steam coil 29. The solvent vapour drawn from the still 28 by the vacuum pump 56 is delivered to the condenser through pipe 57. Vacuum pump 56 is then stopped and valve 55 closed the pure gum being run off through cock 32 and the valve 58 is opened to admit air and break the vacuum the steam valve 30 being then shut off.

To exhaust the refuse in extractor 1 of its undecomposed gum contents, the refuse can be washed with small quantities of solvent each washing after settling being decanted off to the still 28.

To remove all the solvent from extractor 1 the vapour discharge valve 25 is opened and steam blown upon the gum refuse by turning on the steam valve 20 and setting agitator 2 in motion. This forces all the solvent vapour through discharge pipe 24 and valve 25 up to the condenser 36 by pipe 34.

Valves 20 and 25 are then shut off, the discharging door 16 opened and the refuse removed through the discharge hole 15. All the vapour that passes from pipe 34 through the condenser 36 becomes condensed including the steam from the extractor 1. The condensed vapour being solvent and water, it is necessary to remove the water from the solvent and this is done by the water separator 40 in which the water settles to the bottom, the separation level being indicated by the liquid gauge 42. The solvent flows away from the water separator 40 through pipes 46 and sight gauge 47 into the solvent storage tank 49.

The water in the water separator 40 can be kept at one level by the height of the water drain pipe 43 which can be increased or decreased as desired by attaching a longer or shorter pipe 43 to the flexible joint 45.

The specific gravity of the solvent being less than water, the column of water in the drain pipe 43 will support the smaller column of water in the separator 40 plus the column of solvent from the separation level to the discharge pipe 46.

A water drain valve 52 is fitted to the bottom of the solvent storage tank 49 to drain off any water which may collect as indicated in the liquid gauge 51.

An air valve 50 is fitted to the top of the solvent storage tank 49 to allow escape or to admit air if desired to the system.

I claim:

A method for obtaining purified kauri-gum from crude kauri-gum consisting in drying and crushing the crude material, agitating the same with a solvent consisting of ethyl ether or a mixture of ethyl ether and a volatile hydrocarbon for extracting the pure gum and the essential oils, and separating the solvent from the extract by volatilization.

In testimony whereof he affixes his signature.

NIVEN BUCHAN.